(12) United States Patent
Shirasaka et al.

(10) Patent No.: US 7,659,946 B2
(45) Date of Patent: Feb. 9, 2010

(54) LIQUID CRYSTAL PROJECTOR

(75) Inventors: Yasuhiro Shirasaka, Kanagawa (JP);
Hitoshi Inukai, Kumamoto (JP);
Tomoya Yano, Kanagawa (JP)

(73) Assignee: Sony Corporation, Tokyo (JP)

( * ) Notice: Subject to any disclaimer, the term of this patent is extended or adjusted under 35 U.S.C. 154(b) by 412 days.

(21) Appl. No.: 11/571,368

(22) PCT Filed: Jun. 13, 2005

(86) PCT No.: PCT/JP2005/010796

§ 371 (c)(1),
(2), (4) Date: Dec. 28, 2006

(87) PCT Pub. No.: WO2006/001188

PCT Pub. Date: Jan. 5, 2006

(65) Prior Publication Data
US 2008/0043158 A1 Feb. 21, 2008

(30) Foreign Application Priority Data
Jun. 29, 2004 (JP) ............................. 2004-191938

(51) Int. Cl.
*G02F 1/1335* (2006.01)
(52) U.S. Cl. .......................................... 349/9
(58) Field of Classification Search .................. None
See application file for complete search history.

(56) References Cited

U.S. PATENT DOCUMENTS 5,375,006 A 12/1994 Haas
5,490,006 A 2/1996 Masumoto et al.
6,226,064 B1 5/2001 Shimada et al.
6,556,266 B1 4/2003 Shirochi et al.
2002/0018162 A1 2/2002 Suzuki et al.
2003/0103182 A1 6/2003 Mi et al.

(Continued)

FOREIGN PATENT DOCUMENTS

JP 04-153621 10/1990

(Continued)

OTHER PUBLICATIONS

European Search Report issued Feb. 7, 2008 in connection with European Patent Application No. 05748834.8.

*Primary Examiner*—Sung H Pak
(74) *Attorney, Agent, or Firm*—Sonnenschein Nath & Rosenthal LLP

(57) ABSTRACT

Disclosed is a transmissive liquid crystal projector carrying a vertical alignment liquid crystal device. The liquid crystal projector includes a liquid crystal panel (25), on the light incident side and on the light radiating side of which a light incident side polarizing plate (24) and a light radiating side light polarizing plate (26) are arranged, respectively. A first polarized light component in a light beam collected by an illuminating optical system is transmitted through the light incident side polarizing plate (24) and routed to the liquid crystal panel (25). An optical anisotropic device (45), tilted by a preset angle correlated with the direction of alignment of liquid crystal molecules in the liquid crystal panel (25), that is, a pre-tilt angle, is arranged between the light incident side polarizing plate (24) and the liquid crystal panel (25) or between the light radiating side light polarizing plate (26) and the liquid crystal panel (25). By so doing, a high contrast ratio may be maintained, while transmittance of the liquid crystal panel may be improved.

7 Claims, 13 Drawing Sheets

U.S. PATENT DOCUMENTS

2004/0085487 A1  5/2004  Chen et al.

FOREIGN PATENT DOCUMENTS

| | | |
|---|---|---|
| JP | 04-153621 | 5/1992 |
| JP | 06-331979 | 12/1994 |
| JP | 10-282487 | 10/1998 |
| JP | 11-109335 | 4/1999 |
| JP | 2001-042314 | 2/2001 |
| JP | 2001-117099 | 4/2001 |

LIQUID CRYSTAL PROJECTOR

TECHNICAL FIELD

This invention relates to a liquid crystal projector employing a vertical alignment liquid crystal device. More particularly, this invention relates to a liquid crystal projector capable of improving the contrast and the response speed together.

The present invention contains subject matter related to Japanese Patent Application JP 2004-191938 filed in the Japanese Patent Office on Jun. 29, 2004, the entire contents of which being incorporated herein by reference.

BACKGROUND ART

There has so far been known a liquid crystal projector for forming an image light beam by light modulation of light, output from a light source, with e.g. a transmissive liquid crystal panel, and for projecting the so formed image light beam on e.g. a screen. With this liquid crystal projector, light modulation is effectuated by liquid crystal panels, associated with three prime color light beams of red (R), green (G) and blue (B), and the respective light beams, formed by this light modulation, are synthesized together to output a full-color image.

A liquid crystal projector for eliminating irregularities in a picture image and for improving the contrast by widening the viewing angle of a liquid crystal panel has been proposed in JP Laid-Open Patent Publication 2001-42314. The liquid crystal projector, disclosed in this Laid-Open Patent Publication, includes a lamp 102 including a light emitting unit 102b at a focal point position of a reflector 102a, as shown in FIG. 1. A light beam, radiated from the lamp 102, is radiated forwards from an opening part of the lamp as a light beam substantially parallel to the optical axis of the reflector 102a.

On a downstream side stage of the lamp 102, there are arranged a multi-lens array 103, made up of a plural number of lens cells, arranged in, for example, a square array, and another multi-lens array 104. An envelope of the lens cells of the multi-lens array 103 is of a shape and an aspect ratio similar to those of an irradiated area of a liquid crystal panel, formed of, for example twisted nematic liquid crystal, and making up liquid crystal panel sections 110, 113, 119, which will be explained later. The other multi-lens array 104 is made up of a plural number of lens cells, arranged facing the lens cells of the multi-lens array 103. The light beam collected by the multi-lens arrays 103, 104 is turned into a polarized light beam of a predetermined direction of polarization by a light polarization block 105. That is, the unpolarized light, i.e. P-polarized light plus S-polarized light, radiated from the lamp 102, is passed through the light polarization block 105 and thereby converted into a light beam of a predetermined direction of light polarization, for example, P-polarized light, for matching with the liquid crystal panel sections 110, 113, 119. Meanwhile, the explanation on the light polarization block 105 is dispensed with.

The light converted into, for example, the P-polarized light beam, by the light polarization block 105, falls on a plano-convex lens 106, arranged next to the light polarization block 105. This plano-convex lens 106 is configured for collecting the light beam from the light polarization block 105 for efficiently illuminating the liquid crystal panels.

The light beam radiated from the plano-convex lens 106, that is, the white light, initially falls on a dichroic mirror 107, adapted for transmitting a red light beam R. The dichroic mirror transmits the red light beam R and reflects a green light beam G and a blue light beam B. The red light beam R, transmitted through the dichroic mirror 107, has its proceeding direction bent by e.g. 90° by a mirror 108, and is routed to a liquid crystal panel section 110 via a plano-convex lens 109.

On the other hand, the green light beam G and the blue light beam B, reflected by the dichroic mirror 107, are separated from each other by a dichroic mirror 104 adapted for transmitting the blue light beam B. That is, the green light beam G is reflected by the dichroic mirror 104 and routed to the liquid crystal panel section 113 through a plano-convex lens 112. The blue light beam B is transmitted through the dichroic mirror 104 and proceeds rectilinearly to get to the liquid crystal panel section 119 through a relay lens 114, a mirror 115, a relay lens 116, a mirror 117 and a plano-convex lens 118.

The light beams of the respective colors, light-modulated by the liquid crystal panel sections 110, 113, 119, are incident on a cross-prism 120, which cross-prism 120 is formed by joining plural glass prisms together. On the junction surfaces of the glass prisms are formed interference filters 121a, 121b having preset optical characteristics. For example, the interference filter 121a is constructed to reflect the red light beam R and to transmit the green light beam G, while the interference filter 121b is constructed to reflect the blue light beam B and to transmit the green light beam G. Hence, the red light beam R is transmitted through the interference filter 121a, while the blue light beam B is transmitted through the interference filter 121b, so that both light beams get to a projection lens 122, where the respective light beams are synthesized on a sole optical axis.

With the above-described liquid crystal projector 100, such a problem arises that the contrast is lowered depending on the viewing angle. This problem, concerned with the viewing angle, may be attributable to the twist of the twisted nematic liquid crystal molecules that make up a liquid crystal panel, as shown in FIG. 2. In this figure, there is shown an array of liquid crystal molecules of a normally white liquid crystal panel 132 arranged between light polarizing plates 130, 133. An arrow indicated by a solid line in each of oriented films 132a, 132b indicates the direction of processing for alignment. If a driving voltage is applied to the liquid crystal panel 132, constructed as described above, liquid crystal molecules are set upright, from the state shown, such as to shut off any incident light beam. On an interface of each of the oriented films 132a, 132b, the direction of alignment of liquid crystal molecules has a preset angle relative to the direction of processing for alignment. This preset angle is termed a pre-tilt angle. This preset angle is the angle of molecular alignment initially afforded to the direction of processing for alignment for guiding the driving direction of the liquid crystal molecules on application of a driving voltage. By applying the driving voltage to the liquid crystal panel 132 to set the liquid crystal molecules upright, it becomes possible to display the black level. However, the light blocking performance related with the viewing angle is deteriorated under the above-mentioned effect of the pre-tilt angle to produce the phenomenon of whiting of black color to lead to contrast deterioration.

Hence, in the conventional liquid crystal projector 100, a phase difference film 131 is arranged between the light polarizing plate 130 and the liquid crystal panel 132 to improve the contrast, as shown in FIG. 3. In the liquid crystal panel 132, shown in FIG. 3, a first light polarizing plate 130, arranged on the light incident side, has an axis of polarization, that is, the direction of polarization, along the z-axis, for example. Hence, the light beam passed through the light polarizing plate 130 gets to the phase difference film 131. This phase difference film 131 is arranged so that a retarded phase axis or a fast axis thereof crosses the axis of light polarization of the light polarizing plate 130. In addition, the phase difference film 131 is arranged at a preset angle of tilt about an axis of rotation which is contained in a plane of the phase difference film 131 and which extends parallel to the axis of light polarization of the light polarizing plate 130. As for the liquid crystal panel 132, the direction of processing for alignment of the orienting film 132a is the x-axis direction, while that of the orienting film 132b is the y-axis direction, as in the case shown in FIG. 2. The liquid crystal molecules are oriented with a required pre-tilt angle, as indicated by thick bars entered in the figure in connection with the orienting films 132a, 132b. Hence, an angular difference corresponding to the aforementioned preset pre-tilt angle exists between the axis of light polarization of the light polarizing plate 130 and the direction of alignment of the liquid crystal molecules. The phase difference film 131 corrects this angular difference so that the phase of the light beam transmitted through the light polarizing plate 130 is in keeping with the array of the liquid crystal molecules of the orienting film 130a having the pre-tilt angle.

DISCLOSURE OF THE INVENTION

Problem to be Solved by the Invention

Meanwhile, the above-described conventional liquid crystal projector uses twisted nematic liquid crystal as the liquid crystal device. In a recently presented liquid crystal projector, a vertical alignment liquid crystal device has come to be used. With the vertical alignment liquid crystal device, an extremely high contrast ratio may be obtained. However, when the vertical alignment liquid crystal device is mounted on the liquid crystal projector, there are occasions where the direction of alignment of the liquid crystal molecules is disturbed by a co-called transverse electrical field, which becomes strongest in the direction parallel to the substrate surface, with the result that the transmittance is lowered.

For suppressing the transverse electrical field as far as possible, there has been proposed a so-called one-field inversion driving system, in which the electrode potential is inverted from one field to the next. For effectuating this driving, each pixel of the liquid crystal device is required to have a pixel potential capacity sufficient to hold the pixel potential for one field period. Thus, in mounting the vertical alignment liquid crystal device, the liquid crystal device has to be designed and constructed as a reflective liquid crystal device capable of increasing the pixel potential capacity. However, this imposes a constraint in the designing and construction of the liquid crystal projector.

On the other hand, a transmissive liquid crystal device is predominantly used as a liquid crystal device for a liquid crystal projector, from the perspective of ease in manufacture, and attempts are being made for designing and constructing the device as a vertical alignment liquid crystal device. For suppressing the disturbance of alignment of liquid crystal molecules otherwise caused by the transverse electrical field, for achieving the high performance, it may be contemplated to use a method of applying an oblique electrical field, already realized in a straight viewing liquid crystal device, or an alignment controlling method, such as a method of providing an inclined portion in a pixel. In both of these methods, the ratio of opening areas in a display surface (aperture) is sacrificed, such that these methods may not be applied to a liquid crystal device of extremely high definition.

There has also been proposed a method for controlling the pre-tilt angle of the vertical alignment liquid crystal molecules in order to suppress the disturbance of alignment of liquid crystal molecules otherwise caused by the transverse electrical field and in order to improve transmittance of a liquid crystal panel 132 as well as the response speed of the liquid crystal molecules. However, there is presented a problem that a high contrast ratio, as a meritorious point of the vertical alignment liquid crystal device, may not be achieved, such that it is difficult to realize a transmissive liquid crystal projector having mounted thereon the vertical alignment liquid crystal device.

It is therefore an object of the present invention to solve the above problem and to provide a transmissive liquid crystal projector, having mounted thereon a vertical alignment liquid crystal device, in which the transmittance of a liquid crystal panel and the response speed may be improved as a high contrast ratio is maintained.

According to the present invention, there is provided a liquid crystal projector including a light polarization controlling means and a phase difference means. The light polarization controlling means includes a first light polarizing plate and a second light polarizing plate, arranged on a light incident side and on a light radiating side of the liquid crystal device, respectively. The first light polarizing plate transmits a first polarized light component in the light beam collected by the illuminating optical system and routes the transmitted first polarized light component to the liquid crystal device. The second light polarizing plate transmits a second polarized light component in a light beam radiated from the liquid crystal device to route the transmitted second polarized light component to the projection lens. The phase difference means is formed by an optical anisotropic device arranged between the first light polarizing plate and the liquid crystal device or between the second light polarizing plate and the liquid crystal device. The optical anisotropic device of the phase difference means is tilted by an angle correlated with the direction of alignment of liquid crystal molecules in the liquid crystal device.

In an preferred embodiment of the present invention, there is provided a liquid crystal projector including a light source, an illuminating optical system for condensing a light beam, radiated from the light source, on a desired light path, a liquid crystal device for light modulating the light beam, collected by the illuminating optical system, by liquid crystal molecules arranged in a state of vertical alignment, and a projection lens for projecting the light beam, light modulated by the liquid crystal device, to an enlarged scale. The liquid crystal projector comprises a light polarization controlling means and a phase difference means. The light polarization controlling means includes a first light polarizing plate and a second light polarizing plate, arranged on a light incident side and on a light radiating side of the liquid crystal device, respectively. The first light polarizing plate transmits a first polarized light component in the light beam collected by the illuminating optical system and routes the transmitted first polarized light component to the liquid crystal device. The second light polarizing plate transmits a second polarized light component in the light beam radiated from the liquid crystal device to route the transmitted second polarized light component to the projection lens. The phase difference means is formed by an optical anisotropic device arranged between the first light polarizing plate and the liquid crystal device or between the second light polarizing plate and the liquid crystal device. The optical anisotropic device of the phase difference means is tilted by an angle correlated with the direction of alignment of liquid crystal molecules in the liquid crystal device.

With the liquid crystal projector, according to the present invention, in which the optical anisotropic device is mounted at an angle correlated with the pre-tilt angle α of liquid crystal molecules in the liquid crystal panel 5. By so doing, a high contrast ratio may be maintained, while transmittance of the liquid crystal panel as well as the response speed may be improved.

Other objects and specified advantages of the present invention will become more apparent from the following explanation of preferred embodiments thereof especially when read in conjunction with the drawings.

BEST MODE FOR CARRYING OUT THE INVENTION

With reference to the drawings, an embodiment of a liquid crystal projector of a three plate type, according to the present invention, in which three transmissive liquid crystal panels for red, green and blue light beams are used to project a full-color image, will now be described.

Figure 1:
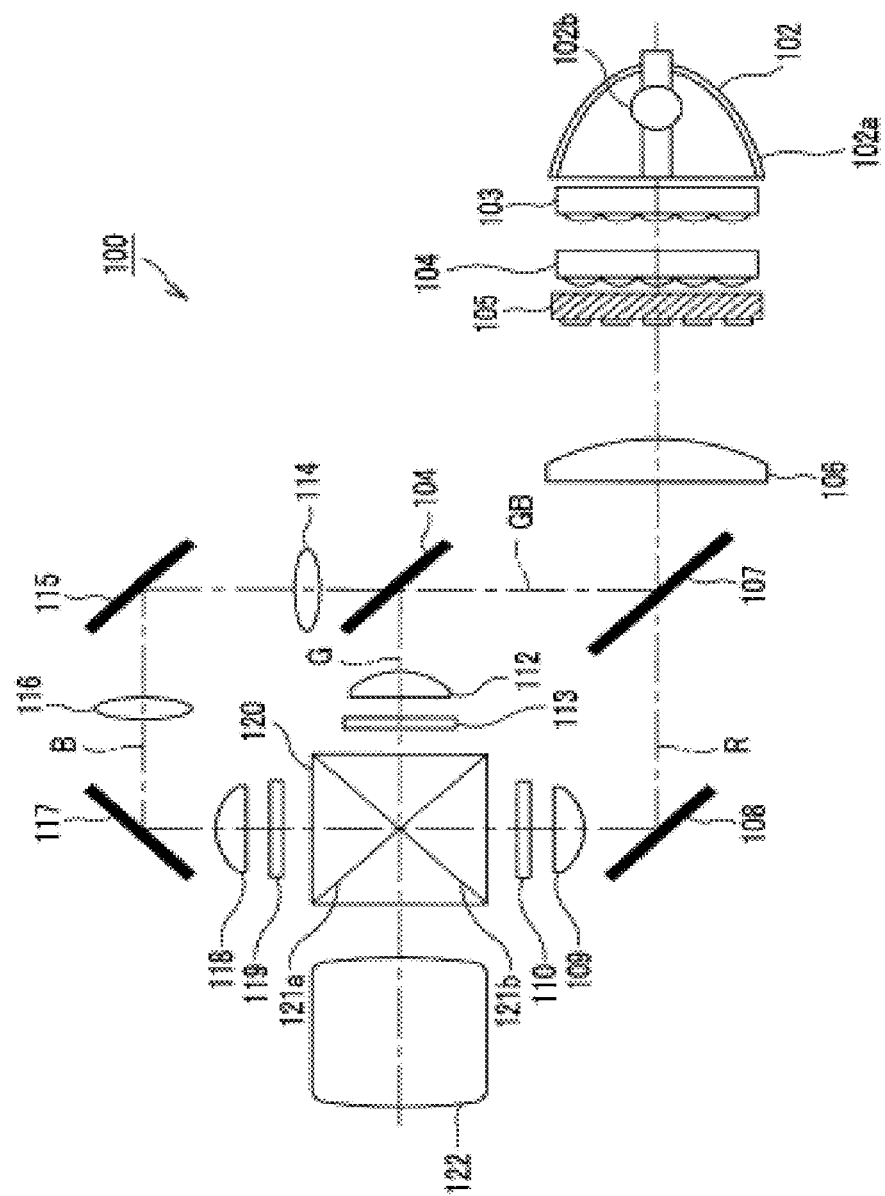
FIG. 1 is a side view showing a conventional liquid crystal projector.
Figure 2:
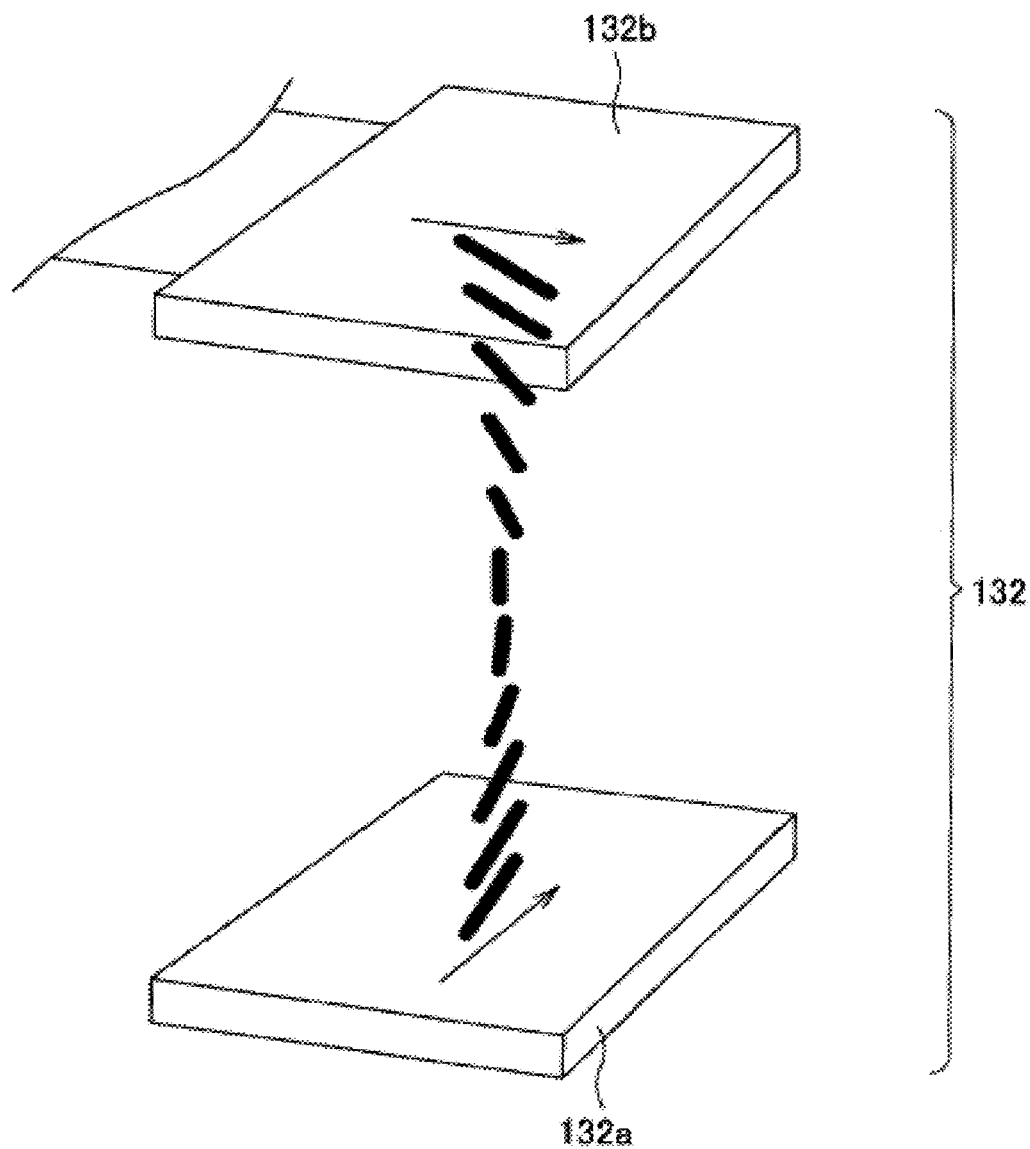
FIG. 2 is a perspective view showing the constitution of twisted nematic liquid crystal molecules that make up a liquid crystal panel.
Figure 3:
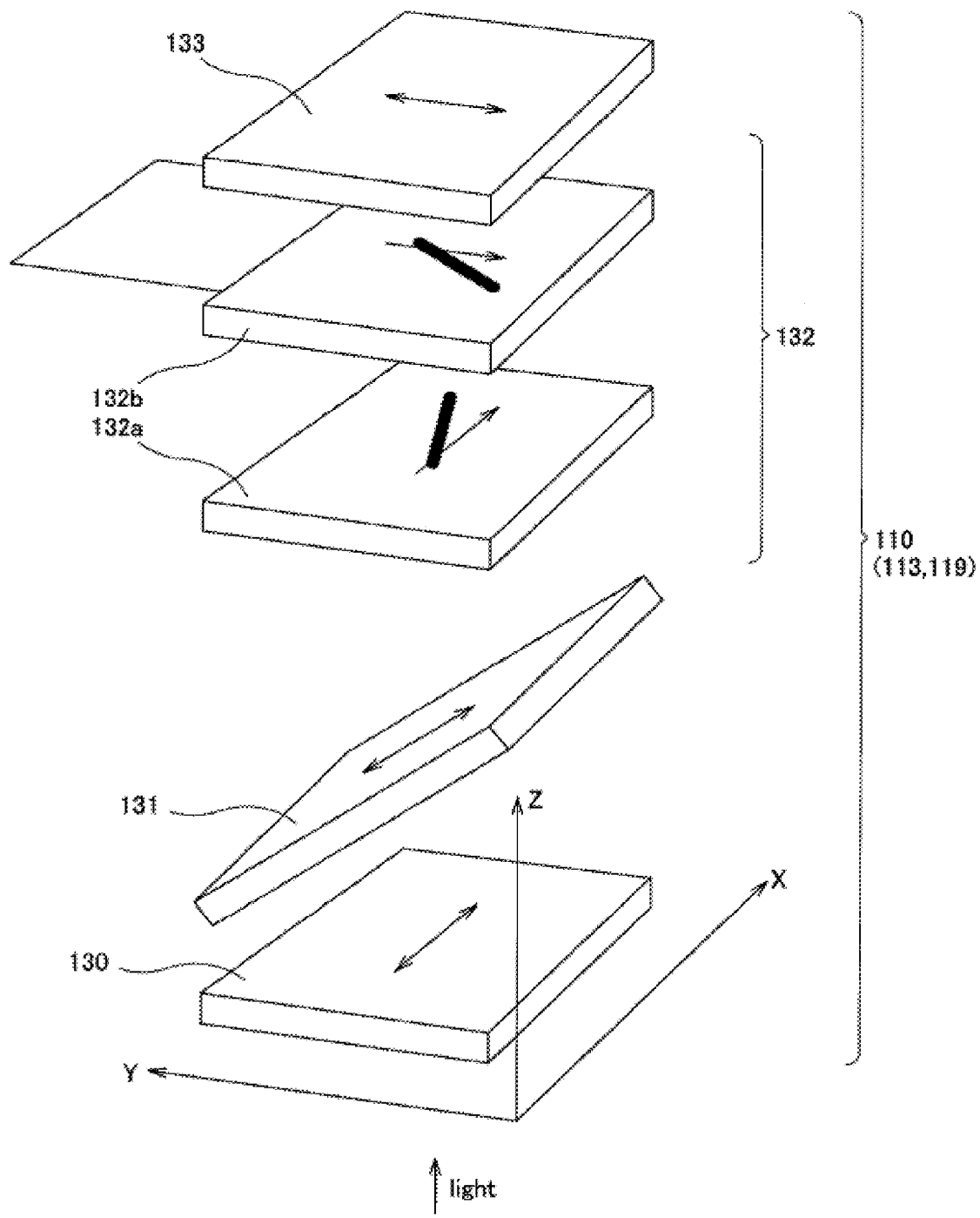
FIG. 3 is a perspective view showing the constitution of a phase difference film arranged between a light polarizing plate and a liquid crystal panel.
Figure 4:
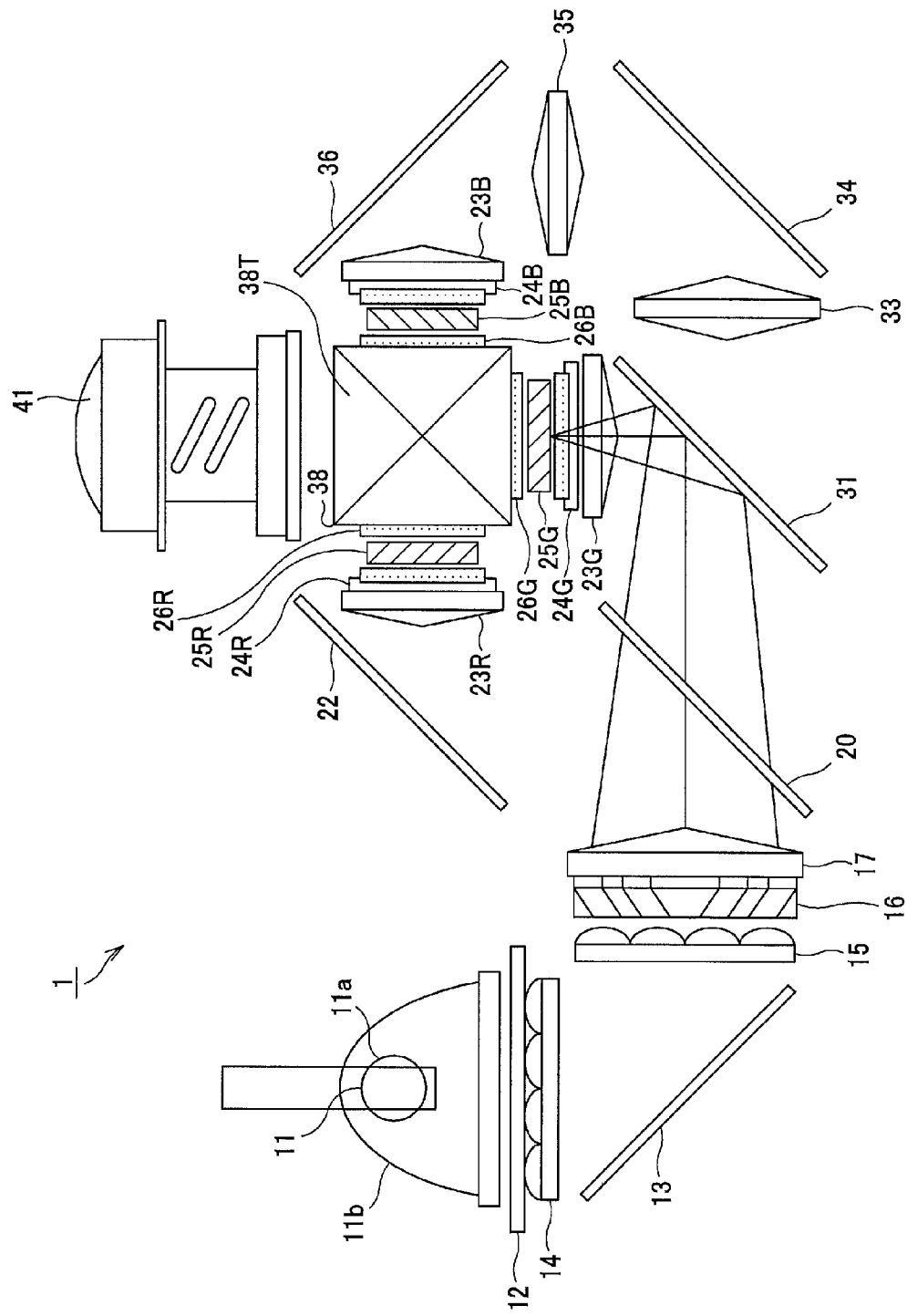
FIG. 4 is a side view showing the constitution of a liquid crystal projector according to the present invention.

A liquid crystal projector 1 projects an image on an external screen. Referring to FIG. 4, the liquid crystal projector 1 includes a light source 11, radiating a light beam, a cut-off filter 12, a first fold-back mirror 13, first and second multi-lens arrays 14, 15, a PS synthetic resin plate 16, a first condenser lens 17 and a first dichroic mirror 20, in this order, along the path of light radiated from the light source 11. The cut-off filter cuts off light outside the visible range, and the first fold-back mirror 13 reflects the light beam falling thereon. Each of the first and second multi-lens arrays 14, 15 is formed by, for example, a square array of a plural number of lens cells having an envelope of an outer shape and an aspect ratio approximately equal to those of an effective aperture area of a liquid crystal panel 25. The PS synthetic resin plate 16 polarizes the light beam from the second multi-lens array 15 along a preset direction of light polarization, and the first condenser lens 17 collects the light beam which has passed through the PS synthetic resin plate 16. The first dichroic mirror 20 separates the light beam in accordance with different wavelength bands.

The light source 11 is adapted for radiating while light, made up of three prime colors of light, namely red color, green color and blue color, as necessitated for projecting a full-color image. This light source 11 includes a light emitting member 11a, emitting white light, and a reflector 11b, adapted for reflecting the light radiated from the light emitting member 11a. The light emitting member 11a of the light source 11 may, for example, be a discharge lamp, in which there is enclosed a gas containing a mercury component, for example, an ultra-high-pressure mercury lamp. The reflector 11b of the light source 11 is a concave mirror having its mirror surface shaped to give high peripheral efficiency. The reflector 11b is shaped to a symmetrical surface of rotation, such as a paraboloid or ellipsoid of rotation.

The cut-off filter 12 is a plane mirror for reflecting and thereby removing the light of an ultraviolet range contained in the white light radiated from the light source 11. For example the cut-off filter 12 is a glass substrate on which is formed a coating for reflecting the light in the ultraviolet range. The cut-off filter allows transmission therethrough of light other than the ultraviolet range.

The first multi-lens array 14 is designed to turn the light, incident thereon, into a light beam of a shape corresponding to an effective area of a liquid crystal panel 25, in conjunction with the second multi-lens array 15, for uniformly illuminating an effective area of a liquid crystal panel 25, as later explained, and for thereby assuring uniform illuminance distribution. The first multi-lens array 14 is formed by arranging a plural number of small lens devices in an array. The light reflected by the first fold-back mirror 13 is collected by the lens devices to form plural small-sized spot light sources. The illuminated light beams from the respective spot light sources are synthesized by the second multi-lens array 15.

The condenser lens 17 is a convex lens which is adapted for adjusting the spot diameter so that the light controlled by the PS synthetic resin plate 16 to a predetermined direction of polarization will be efficiently illuminated on the effective aperture area of the liquid crystal panel 25.

The first dichroic mirror 20 is a wavelength selecting mirror composed of a substrate of e.g. glass, the major surface of which has been coated with plural layers of a dielectric film by way of so-called dichroic coating. This first dichroic mirror 20 separates the incident light into a red light beam to be reflected and other color light beam to be transmitted, that is, a green light beam and a blue light beam.

Specifically, this first dichroic mirror 20 is arranged on a light path of light incident from the condenser lens 17 at an angle of tilt of 45° relative to the perpendicular direction, in order to transmit the blue light beam and green light beam, out of the light beam incident from the condenser lens 17, and to reflect a red light beam in substantially the perpendicular direction, such as to change the direction of the red light beam by 90°.

The liquid crystal projector 1 also includes a second fold-back mirror 22, a first field lens 23R, a first light incident side polarizing plate 24R, a first liquid crystal panel 25R and a first light radiating side polarizing plate 26R, in this order, along the light path of the red light beam, separated by the first dichroic mirror 20. The second foldback mirror totally reflects the light beam, and the first field lens 23R collects the light beam. The first light incident side polarizing plate 24R transmits only a light component of a predetermined direction of polarization, and the first liquid crystal panel 25R spatially modulates the light beam. The first light radiating side polarizing plate 26R transmits only a light component of the predetermined direction of polarization.

The second foldback mirror 22 is a total reflection mirror, reflecting the light beam, reflected by the first dichroic mirror 20, to the vertical direction to change the light direction through 90°. The second foldback mirror is arranged at an angle of 45° to the perpendicular direction on the light path of the reflected red light beam. Thus, the second foldback mirror 22 reflects the red light beam towards the first field lens 23R.

The first field lens 23R is a light collecting lens forming an illuminating optical system together with the condenser lens 17. The first field lens outputs the red light, reflected back from the second foldback mirror 22, towards the first light incident side polarizing plate 24R, while collecting the light on the first liquid crystal panel 25R.

The first light incident side polarizing plate 24R is designed to transmit only a light component of the red light beam having a preset direction of polarization. The red light beam has been output from the first field lens 23R The first light incident side polarizing plate 24R is arranged so that the axis or direction of light transmission thereof will form an angle of 45° with reference to the direction of alignment of liquid crystal molecules on a light incident side substrate surface of the first liquid crystal panel 25R.

The first liquid crystal panel 25R is a transmissive panel, employing vertical alignment liquid crystal molecules, and is made up of two transparent substrates, not shown, between which there are enclosed vertical alignment liquid crystal molecules. The first liquid crystal panel 25R spatially modulates the red light beam, incident via first light incident side polarizing plate 24R, to transmit the so spatially modulated red light beam, as the state of liquid crystal molecules is changed responsive to picture signals entered in association with the red image information. Since the projected image is substantially rectangular in shape, with the size of the image along the horizontal direction being longer than the size thereof along the perpendicular direction, the first liquid crystal panel 25R has a light incident surface of a corresponding shape, that is, a substantially rectangular shape.

The first light radiating side polarizing plate 26R transmits only the light component of the red light beam having the direction of light polarization perpendicular to that of the first light incident side polarizing plate 24R. The red light beam has been modulated by the first liquid crystal panel 25R. The first light radiating side polarizing plate 26R is arranged so that its axis of light transmission (direction of light transmission) forms an angle of 45° relative to the direction of alignment of liquid crystal molecules on the light radiating side substrate surface of the first liquid crystal panel 25R. In short, the first light radiating side polarizing plate 26R and the first light incident side polarizing plate 24R are arranged in a relationship of a so-called crossed nicols, that is, the first light radiating side polarizing plate is arranged so that its axis of light transmission is perpendicular to that of the first light incident side polarizing plate 24R.

The liquid crystal projector 1 also includes a second dichroic mirror 31 for separating the incident light beam depending on the wavelength bands, along the light paths of light beams of the other colors, that is, blue light beam and green light beam, obtained on separation by the first dichroic mirror 20.

The second dichroic mirror 31 separates the incident light beam into the blue light beam and the light beam of the other color, that is, the green light beam.

The second dichroic mirror 31 is arranged at an angle of 45° to the perpendicular direction, with respect to the light path of light incident from the first dichroic mirror 20, in such a manner that the second dichroic mirror transmits the blue light beam, from the light incident from the first dichroic mirror 20, and reflects the green light beam in a substantially horizontal direction towards an image projection unit 2, such as to change the direction thereof by 90°.

The liquid crystal projector 1 includes a second field lens 23G, a second light incident side light polarizing plate 24G, a second liquid crystal panel 25G and a second light radiating side light polarizing plate 26G, in this order, along a light path of the green light beam, obtained on separation by the second dichroic mirror 31. The second field lens collects light, and the second light incident side light polarizing plate transmits only the component of light having the preset direction of light polarization. The second liquid crystal panel 25G spatially modulates the light, and the second light radiating side light polarizing plate 26G transmits only the light component having a preset direction of polarization.

The second field lens 23G is a light condensing lens forming an illuminating optical system together with the condenser lens 17. The second field lens outputs a green light beam, reflected back from the second dichroic mirror 31, towards the second light incident side light polarizing plate 24G, while collecting the green light beam on the second liquid crystal panel 25G.

The second light incident side light polarizing plate 24G is a light polarizing plate for transmitting only the component of a preset direction of polarization of the green light beam output from the second field lens 23G. The second light incident side light polarizing plate 24G is arranged so that the axis of light transmission thereof will be at an angle of 45° with respect to the direction of alignment of liquid crystal molecules on the light incident side substrate surface of the second liquid crystal panel 25G.

The second liquid crystal panel 25G is a transmissive panel employing vertical alignment liquid crystal molecules. The transmissive panel is made up of two transparent substrates, and vertical alignment liquid crystal molecules enclosed in a space defined in-between the transparent substrates. With the second liquid crystal panel 25G, as the status of the liquid crystal molecules is changed responsive to the image signals entered in association with the green image information, the green light beam, incident via second light incident side light polarizing plate 24G, is spatially modulated, and the so modulated green light beam is transmitted. Since the image projected is of a rectangular shape, the second light incident side light polarizing plate 24G has its light incident surface formed to a corresponding shape, that is, to a substantially rectangular shape.

The second light radiating side light polarizing plate 26G transmits only the light component of the green light beam having the direction of light polarization perpendicular to the second light incident side light polarizing plate 24G. The green light beam has been modulated by the second liquid crystal panel 25G. The second light radiating side light polarizing plate 26G is arranged so that the axis of light transmission thereof will be at an angle of 45° with respect to the direction of alignment of liquid crystal molecules on the light radiating side substrate surface of the second liquid crystal panel 25G. The second light radiating side polarizing plate 26G and the second light incident side polarizing plate 24G are arranged in a relationship of so-called crossed nicols, that is, the second light radiating side polarizing plate 26G is arranged so that its axis of light transmission is perpendicular to that of the second light incident side polarizing plate 24G.

The liquid crystal projector 1 also includes, along the light path of blue light beam, separated by the second dichroic mirror 31, a first relay lens 33, for adjusting the length of a light path, a third foldback mirror 34, for totally reflecting the incident light beam, and a second relay lens 35, for correcting the light path length. The liquid crystal projector also includes a fourth foldback mirror 36, for totally reflecting the incident light beam, a third field lens 23B, for collecting the light beam, and a third light incident light polarizing plate 24B, for transmitting only the light component of the incident light beam having a preset direction of polarization. The liquid crystal projector also includes a third liquid crystal panel 25B for spatially modulating an incident light beam, and a third light radiating side light polarizing plate 26B, for transmitting only the light component of the incident light beam having a preset direction of polarization.

The first relay lens 33 is adapted for adjusting the length of the light path, in conjunction with the second relay lens 35, and routes the blue light beam, separated by the second dichroic mirror 31, towards the third foldback mirror 34.

The third foldback mirror 34 reflects the light beam from the first relay lens 33 in the horizontal direction to change the direction thereof by 90°. Specifically, the third foldback mirror is arranged with a tilt to the perpendicular direction of 45° with respect to the light path of the blue light beam from the first relay lens 33. Thus, the third foldback mirror 34 reflects the blue light beam from the first relay lens 33 towards the second relay lens 35.

The second relay lens 35 is adapted for adjusting the length of the light path, in conjunction with the first relay lens 33, and routes the blue light beam, reflected by the third dichroic mirror 34, towards the fourth foldback mirror 36.

It is noted that the light path for the blue light beam up to the third liquid crystal panel 25B is longer than the light path for the red light beam up to the first relay lens 25R or the light path for the green light beam up to the second liquid crystal panel 25G. Hence, the first relay lens 33 and the second relay lens 35 compensate for this difference in light path lengths to route the blue light beam appropriately for correct focusing on the third liquid crystal panel 25B.

The fourth foldback mirror 36 is a total reflection mirror for reflecting the light from the second relay lens 35 in the perpendicular direction for changing the direction thereof through 90°, and is arranged at an angle of 45° to the perpendicular direction with respect to the light path of the blue light from the second relay lens 35. In this manner, the fourth foldback mirror 36 reflects the blue light beam from the second relay lens 35 towards the third field lens 23B.

The third field lens 23B is a condenser lens constituting an illuminating optical system in conjunction with the condenser lens 17. The third field lens outputs the blue light beam, reflected by the fourth foldback mirror 36, towards the third light incident light polarizing plate 24B, while collecting the light beam on the third liquid crystal panel 25B.

The third light incident light polarizing plate 24B is a light polarizing plate for transmitting only the light component of a preset direction of light polarization of the blue light beam output from the third field lens 23B. The third light incident light polarizing plate 24B is arranged so that its axis of light transmission is at an angle of 45° with respect to the direction of alignment of liquid crystal molecules on the light incident side substrate surface of the third liquid crystal panel 25B.

The third liquid crystal panel 25B is a transmissive panel employing vertical alignment liquid crystal molecules. The third liquid crystal panel is made up of two transparent substrates, not shown, and the vertical alignment liquid crystal molecules are sealed in a space defined in-between the transparent substrates. The third liquid crystal panel 25B spatially modulates and transmits the blue light beam, incident thereon via third light incident light polarizing plate 24B, as the status of the liquid crystal molecules is changed responsive to image signals entered in association with the blue image information. Since the projected image is substantially rectangular in shape, the third liquid crystal panel 25B has a correspondingly shaped light incident surface, that is, a substantially rectangular shaped light incident surface.

The third light radiating side light polarizing plate 26B transmits only the light component of the blue light beam having the direction of light polarization at right angles to the third light incident light polarizing plate 24B. The blue light beam has been modulated by the third liquid crystal panel 25B. The third light radiating side light polarizing plate 26B is arranged so that the axis of light polarization thereof is at an angle of 45° with respect to the direction of alignment of liquid crystal molecules on the light radiating side substrate surface of the third liquid crystal panel 25B. In short, the third light radiating side polarizing plate 26B and the third light incident side polarizing plate 24B are arranged in a relationship of a so-called crossed nicols, that is, the third light radiating side polarizing plate 26B is arranged so that its axis of light transmission is perpendicular to that of the third light incident side polarizing plate 24B.

The liquid crystal projector 1 also includes a light synthesizing prism 38 and a projection lens 41, at the location of intersection of the light paths of the red, green and blue light beams, spatially modulated by the first to third liquid crystal panel 25R, 25G and 25B, respectively, and transmitted through the light radiating side light polarizing plates 26R, 26G and 26B, respectively. The light synthesizing prism 38 synthesizes the red, green and blue light beams, and the projection lens 41 projects the light beam, synthesized by the light synthesizing prism 38 towards a screen.

On the light synthesizing prism 38 are incident the red light beam, radiated from the first liquid crystal panel 25R and transmitted through the first light radiating side polarizing plate 26R, the green light beam, radiated from the second liquid crystal panel 25G and transmitted through the second light radiating side polarizing plate 26G, and the blue light beam, radiated from the third liquid crystal panel 25B and transmitted through the third light radiating side polarizing plate 26B. The light synthesizing prism 38 synthesizes the incident red, green and blue light beams to radiate the synthesized light beam from a light radiating surface 38T.

The projection lens 41 projects the synthesized light, radiated from the light radiating surface 38T of the light synthesizing prism 38, on the screen to an enlarged scale.

The liquid crystal panels 25R, 25G and 25B will now be described in further detail.

Figure 5:
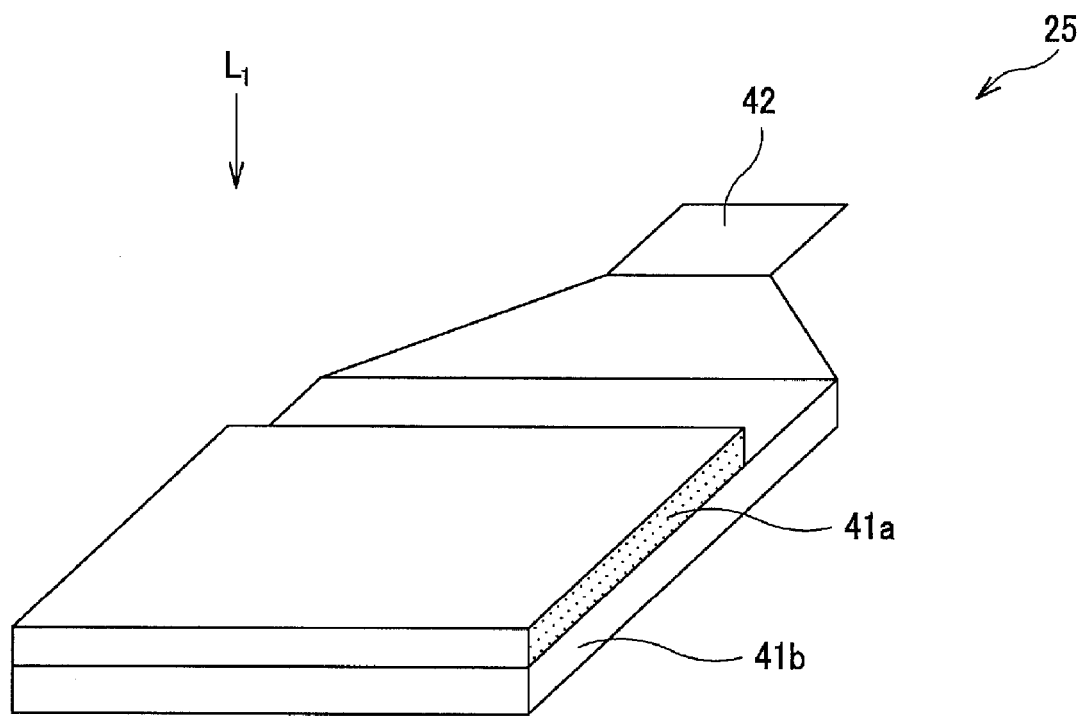
FIG. 5 is a perspective view showing a liquid crystal panel used in the liquid crystal projector according to the present invention.

FIG. 5 depicts a perspective view of the liquid crystal panel 25. Referring to FIG. 5, the liquid crystal panel 25 is formed by stacking a light incident side liquid crystal substrate 41a and a light radiating side liquid crystal substrate 41b together. On the light incident side liquid crystal substrate 41a falls incident light $L_i$ from a light incident side light polarizing plate 24. In a space defined between the substrates 41a, 41b, there are enclosed vertical alignment liquid crystal molecules. A section for voltage impression 42 for applying the voltage to the liquid crystal device is connected to the light radiating side liquid crystal substrate 41b.

Figure 6:
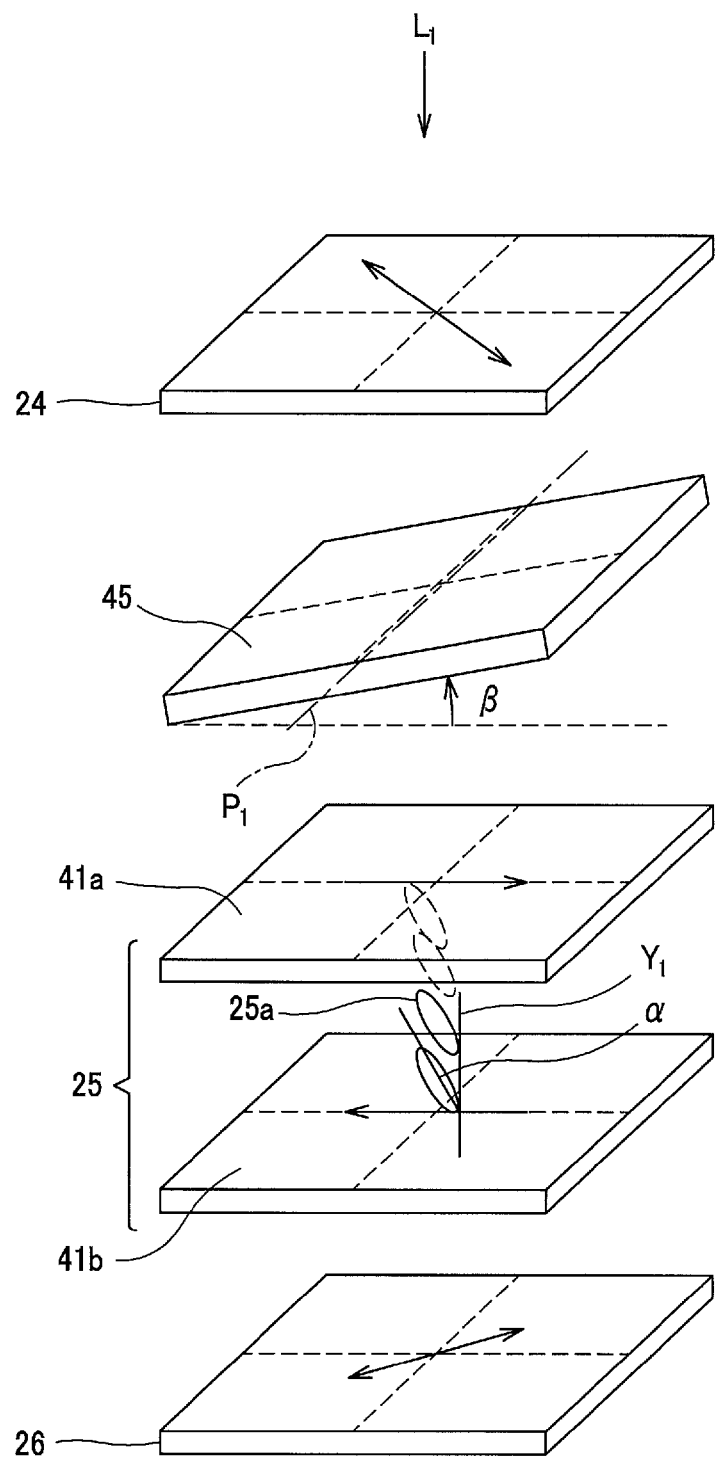
FIG. 6 is a perspective view showing the constitution from a light incident side light polarizing plate up to a light radiating side light polarizing plate in the liquid crystal projector of the present invention.

FIG. 6 shows a detailed constitution of the liquid crystal projector from the light incident side light polarizing plate 24 up to the light radiating side light polarizing plate 26 according to the present invention. There are arrayed vertical alignment liquid crystal molecules 25a, sandwiched between the light incident side liquid crystal substrate 41a and the light radiating side liquid crystal substrate 41b, in homeotropic alignment, with an angle of tilt α with respect to a normal line $Y_1$ drawn to the substrate surface. This angle α is referred to below as a pre-tilt angle. In the present embodiment, it is presupposed that, by setting the pre-tilt angle α to 12° to impart a strong force of alignment control, the liquid crystal molecules do not suffer from alignment disturbances under any transverse electrical fields.

Meanwhile, the pre-tilt angle α of 20° is sufficient if it is intended to produce a force of alignment control which may oppose the transverse electrical fields at the time of the one-line inversion driving. Hence, the pre-tilt angle α is set within a range of 1° to 20°.

In the liquid crystal projector 1, according to the present invention, an optical anisotropic device 45 is arranged with a preset angle of tilt β between the light incident side light polarizing plate 24 and the liquid crystal panel 25, for improving e.g. the contrast, as shown in FIG. 6. This optical anisotropic device 45 is a negative uniaxial phase plate formed of, for example, a polystyrene polymer, an acrylate based polymer, a methacrylate based polymer, an acrylonitrile polymer or a methacrylonitrile polymer. This optical anisotropic device 45 may be formed as a multi-layer film of an inorganic dielectric material, convenient for use as a projector, such as, for example, $Ti_2O_5$ or $SiO_2$.

This optical anisotropic device 45 may be coated on its surface with an antireflection film, since the optical anisotropic device is arranged with a tilt with respect to the incident light beam and, in this consideration, light loss otherwise caused by reflection needs to be minimized. In such case, the reflectance of the optical anisotropic device 45, coated with the antireflection film, is preferably 1% or less and, more preferably, 0.5% or less.

This optical anisotropic device 45, constructed as described above, is arranged so that the optical anisotropic device will be perpendicular to the direction of alignment of the liquid crystal molecules, that is, so that the optical anisotropic device will be rotated through an angle β from the plane parallel to the liquid crystal substrate 41, with the optical axis $P_1$ of the optical anisotropic device 45 as the center of rotation, as shown for example in FIG. 6. The direction of rotation at this time is approximately the same as the direction of pre-tilt of the liquid crystal molecules.

Figure 7B:
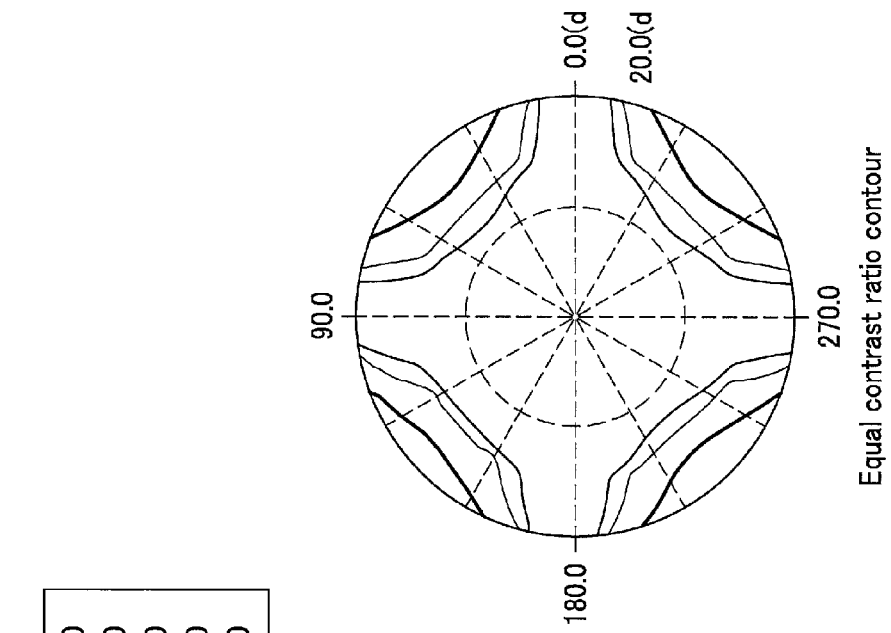
FIGS. 7A and 7B are graphs showing contrast characteristics in the liquid crystal projector according to the present invention.
Figure 7A:
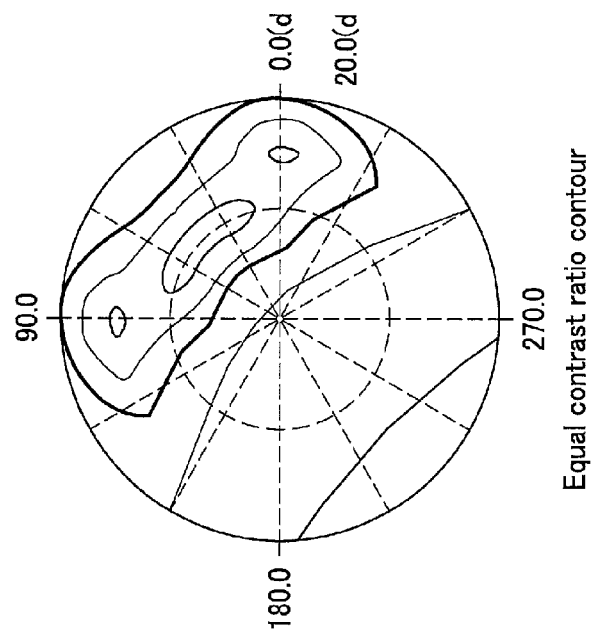

If the optical anisotropic device 45 with the retardation (Δnd) of −427 nm is arranged so that β=14° for the pre-tilt angle α=12°, the contrast of 2000:1 or higher may be realized for the direction of a polar angle of 10° or more, as shown in FIG. 7A. Additionally, the viewing angle characteristics may be closer to an ideal state. In the absence of the optical anisotropic device 45, a zone with the contrast of 2000:1 for the polar angle of up to 20° is appreciably offset from the center, as shown in FIG. 7B. Viz., it may be seen that, since the liquid crystal molecules are tilted by the pre-tilt angle α, the front-side contrast is appreciably lowered, while viewing angle characteristics are simultaneously aggravated, except if this tilt of the liquid crystal molecules is removed by tilting the optical anisotropic device 45. Meanwhile, Δnd of the liquid crystal molecules, when finding the tendency of FIG. 7B by calculations, is set to 427 nm. Although Δnd of the optical anisotropic device 45 and Δnd of the liquid crystal molecules are desirably equal in magnitude and opposite in polarity, an error on the order of ±50 nm is correctable. The Δnd value is designed in a range of 300 nm to 500 nm in case of using a transmissive vertical alignment liquid crystal device. The Δnd value may also be optimized for each of red light beam, green light beam and blue light beam.

Figure 8:
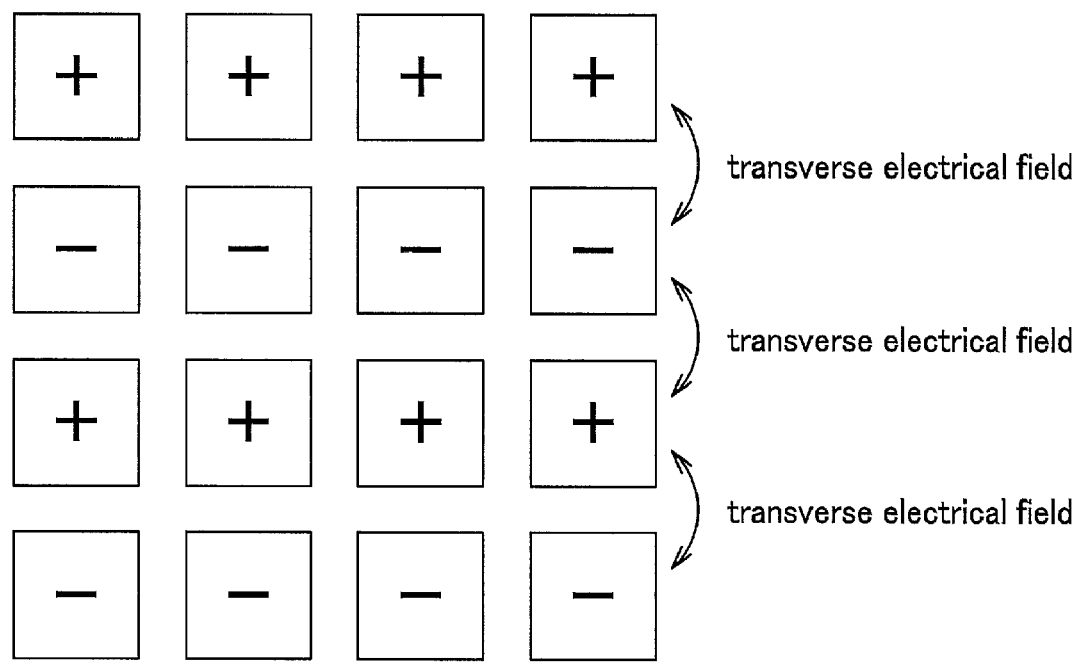
FIG. 8 is a diagram showing the state of applying an electrical field for one-line inversion driving across the substrates of the liquid crystal device.
Figure 9:
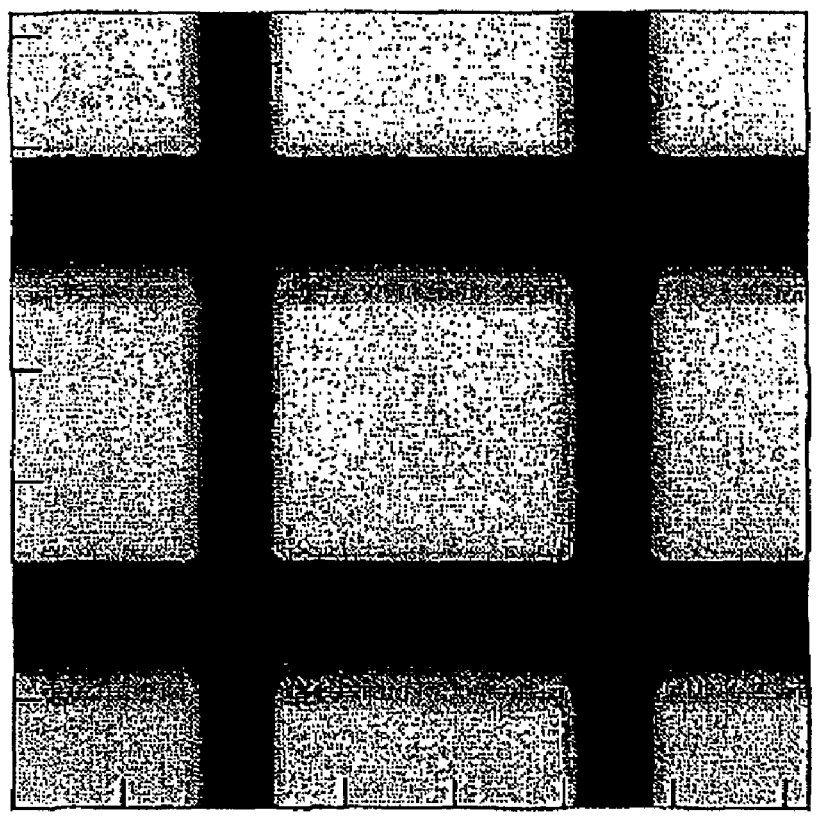
FIG. 9 shows the display state obtained on arranging an optical anisotropic device with angular inclination.

Meanwhile, in case the liquid crystal projector 1 according to the present invention is used as a transmissive 3-plate liquid crystal projector, the pre-tilt angle α of the liquid crystal molecules is set to 12° in a majority of cases. By arranging the optical anisotropic device 45 with the tilt angle as described above, in case of applying an electrical field for one-line inverted driving, as shown in FIG. 8, across the liquid crystal substrates 41, an optimum display state, such as is shown in FIG. 9, may be obtained by arranging the optical anisotropic device 45, tilted as described above.

Figure 10B:
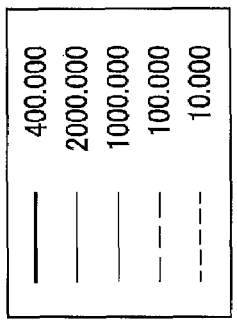
FIGS. 10A and 10B show contrast characteristics in case of a small pre-tilt angle α of liquid crystal molecules
Figure 10B:
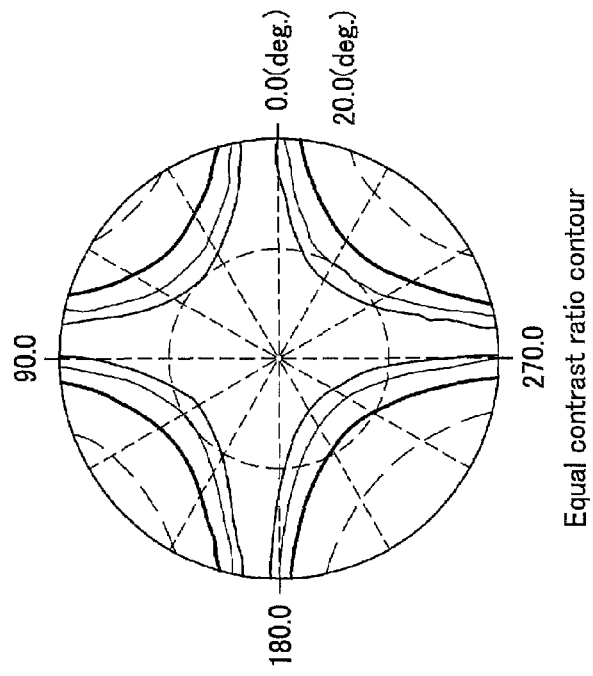
Figure 10A:
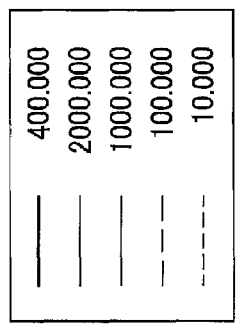
Figure 10A:
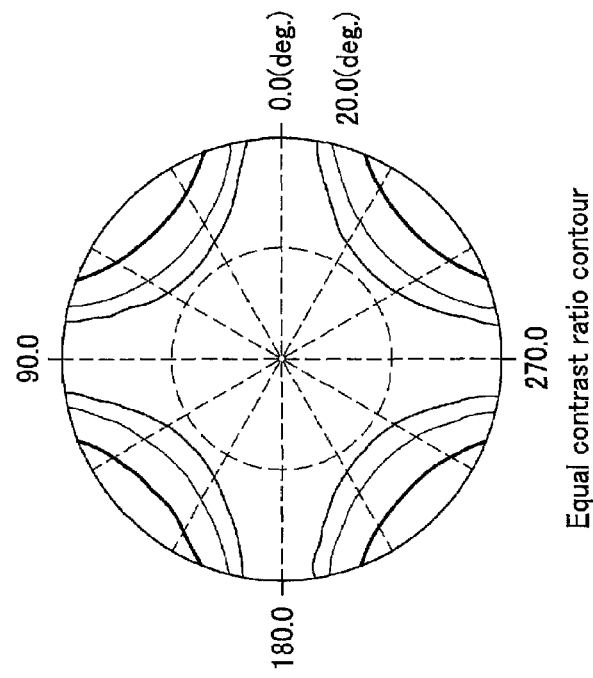

The above-mentioned contrast characteristics may be obtained even with a small pre-tilt angle α of liquid crystal molecules. For α=2°, the contrast characteristics are as shown in FIG. 10A. The optical anisotropic device 45 may be arranged with an angle of tilt, associated therewith, whereby an ideal contrast with a broad viewing angle, such as is shown in FIG. 10B, may be obtained.

Thus, the optical anisotropic device 45 is arranged between the light incident side light polarizing plate 24 and the liquid crystal panel 25, and is tilted an angle of rotation β approximately equal to the pre-tilt angle α of the liquid crystal molecules in the liquid crystal panel 25, whereby the contrast may be improved further.

Figure 11A:
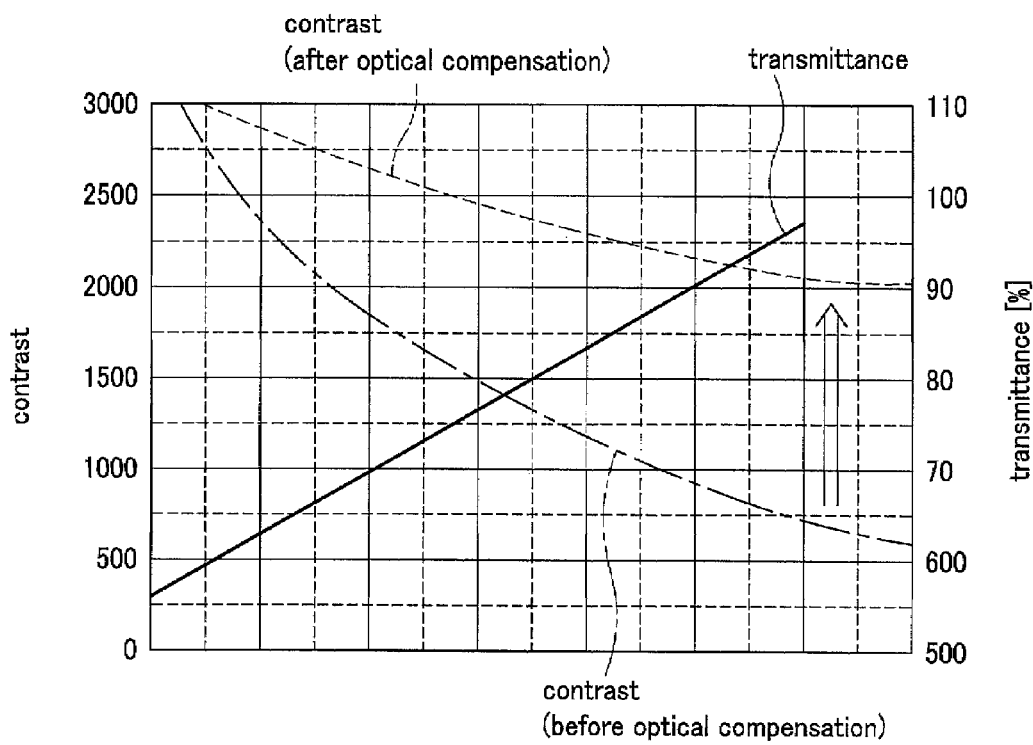
FIGS. 11A and 11B are graphs showing the relationship of contrast characteristics, transmittance and the response speed of the liquid crystal device on one hand and the pre-tilt angle α on the other hand.
Figure 11B:
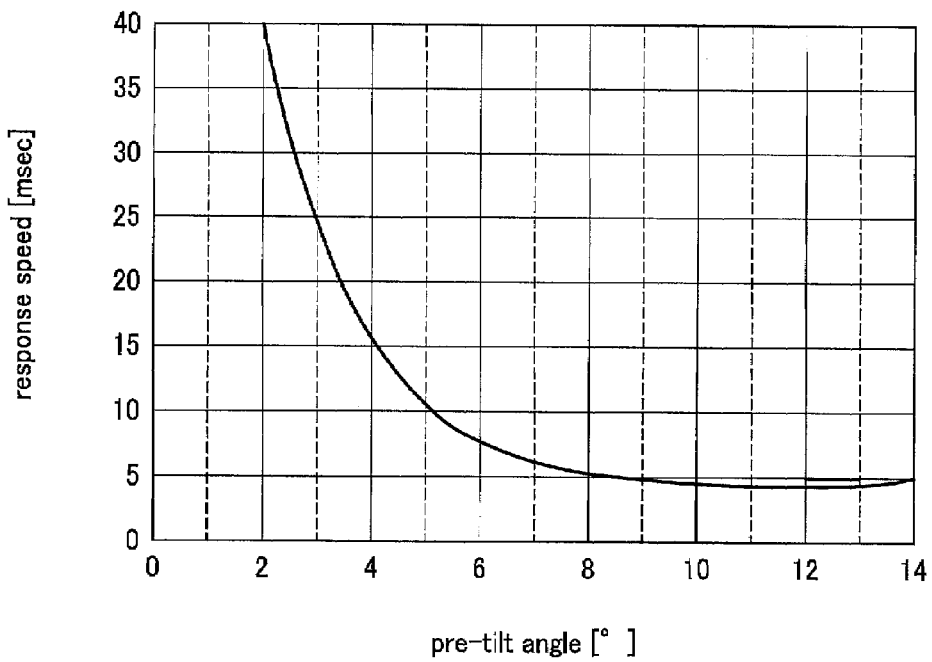

FIGS. 11A and 11B show the relationship with respect to the pre-tilt angle α of the contrast characteristics, transmittance and the response speed of the liquid crystal molecules. With the vertical alignment liquid crystal molecules, the contrast may be higher by setting the pre-tilt angle α to a smaller value, prior to optical compensation by the optical anisotropic device 45, as shown in FIG. 11A. However, if the pre-tilt angle α is set to a smaller value, at the time of the one-line inversion driving, the transmittance is drastically lowered due to domain generation, with the response speed being also slow, as shown in FIG. 11B.

If, on the other hand, the pre-tilt angle α is set to a higher value, to such an extent that the transmittance is on the order of 90%, the response speed is improved concomitantly. However, the contrast prior to the optical compensation, shown in FIG. 11A, is drastically lowered.

By arranging the optical anisotropic device 45, having a tilt angle controlled according to the present invention, the contrast subsequent to optical compensation may be set to 2000:1 or higher, as shown in FIG. 11A, and hence may be improved. In particular, according to the present invention, the contrast may be improved with advantage as the transmittance and the response speed of the liquid crystal device are set to better states. In short, a high-quality liquid crystal projector improved in moving picture characteristics may be achieved.

In particular, with the liquid crystal projector 1, a vaporized film, composed of an inorganic material, may be used as the aforementioned oriented film for the liquid crystal. Moreover, no special axis tilting processing is needed for the optical anisotropic device 45, and hence the optical anisotropic device may be formed by a multi-layer film of the inorganic oxide. Hence, all of the projector components, excluding the liquid crystal, may be formed of an inorganic material, thereby improving the weatherability.

In addition, with the liquid crystal projector 1, in which improvement in weatherability, high contrast and improvement in viewing angle characteristics may be achieved in combination, it is possible to widen the angle of divergence of the incident light, thereby realizing a projector with higher brightness.

In the above-described embodiment, the case of the pre-tilt angle α and the angle of rotation β being approximately the same has been explained. The present invention is not limited to this case and the angle of rotation β of the optical anisotropic device 45 may be any angle on the condition that it is correlated with the pre-tilt angle α. The optical anisotropic device 45 may also be tilted at such an angle that the direction perpendicular to the direction of alignment of liquid crystal molecules in the liquid crystal panel 25 becomes the axis of rotation of the optical anisotropic device.

The angle of rotation β may also be correlated with the refractive index $n_1$ of the liquid crystal panel 25 and with the refractive index $n_2$ of a medium from the liquid crystal panel 25 as far as the optical anisotropic device 45. The pre-tilt angle α and the angle of rotation β may be expressed, based on the Snell's law, in accordance with the following equation (1):

$$n_1 \sin \alpha = n_2 \sin \beta \quad (1)$$

In the above-described configuration, shown in FIG. 6, the medium from the liquid crystal panel 25 as far as the optical anisotropic device 45 is air. Thus, by substituting 1 for $n_2$, and substituting the refractive index for the ordinary light $n_o$ for the liquid crystal molecules for $n_1$, it is seen that contrast characteristics may be improved in case β=14° for the pre-tilt angle α=12°.

In similar manner, in case the medium from the liquid crystal panel 25 as far as the optical anisotropic device 45 is of a refractive index different from that of air, an optimum angle of rotation β for improving e.g. the contrast characteristics may be determined by substituting the refractive index of the medium into the equation (1).

Figure 12A:
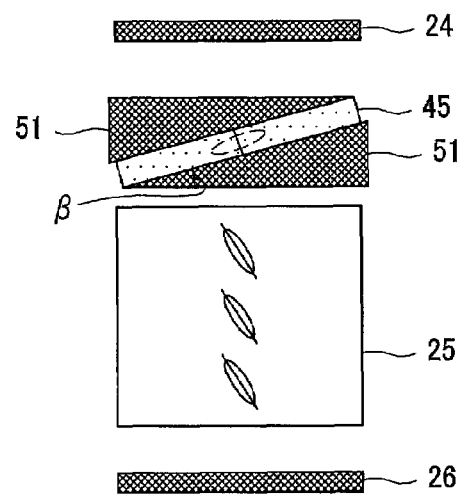
FIGS. 12A and 12B are schematic views showing the constitution of sandwiching the optical anisotropic device between a pair of obliquely sliced medium pieces.

FIG. 12A shows the manner in which the optical anisotropic device 45 is sandwiched between obliquely sliced pieces of a medium 51. In the constitution of FIG. 12A, the angle of rotation β of the optical anisotropic device 45 is fixed at the outset. This angle of rotation β may be found from the equation (1), in dependence upon the refractive index $n_2$ of the medium 51 as far as the optical anisotropic device 45. The slicing angle of the medium 51 is adjusted to give the angle of rotation β as found from the equation (1).

Figure 12B:
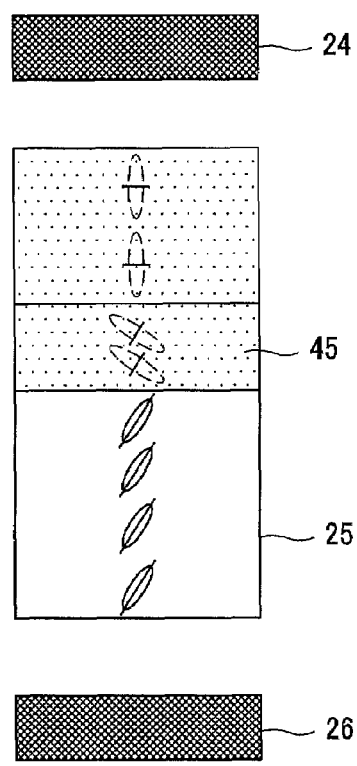

FIG. 12B shows a case where the optical anisotropic device 45, having its axis tilted obliquely at the outset, is directly mounted on the liquid crystal panel 25. The axis of the optical anisotropic device 45, shown in FIG. 12B, is controlled to the angle of rotation β, depending on its refractive index. Hence, in this configuration, the contrast characteristics, for example, may similarly be improved as well.

The liquid crystal projector 1, embodying the present invention, is not limited to the above-described embodiment. For example, the angle of rotation β of the optical anisotropic device 45 may freely be changed.

Figure 13B:
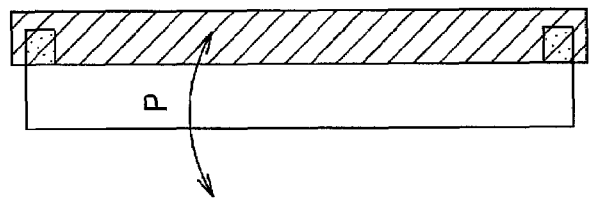
FIGS. 13A and 13B are a front view and a side view, respectively, showing a compensation plate tilting mechanism for varying an angle of rotation β of the optical anisotropic device.
Figure 13A:
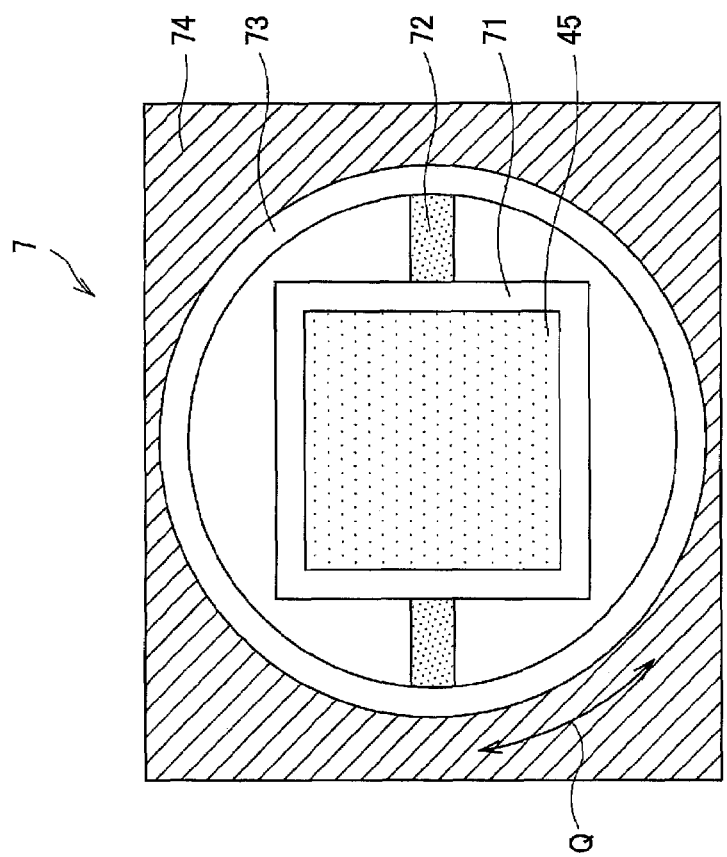

FIGS. 13A and 13B show a compensation plate tilt mechanism 7 for changing the angle of rotation β of the optical anisotropic device 45. This compensation plate tilt mechanism 7 includes an optical compensation plate mounting unit 71, a tilt shaft 72, a rotary ring 73 and a support 74. The optical compensation plate mounting unit immobilizes the optical anisotropic device 45. The tilt shaft 72 allows rotation of the optical compensation plate fixation unit 71 in a direction indicated by arrow P in FIG. 13B. The rotary ring 73 allows rotation of the optical compensation plate mounting unit 71 in a direction indicated by arrow Q in FIG. 13A, and the support 74 is arranged around the rotary ring 73.

Thus, by freely rotating the optical anisotropic device 45 in the directions indicated by arrow P in FIG. 13B or by arrow Q in FIG. 13A, it is possible to make finer adjustment of the angle of rotation β. In particular, if desired to correct the preset angle of rotation β, depending on the actual use environment of the liquid crystal projector 1, such correction may readily be made in case the optical anisotropic device 45 is mounted on this compensation plate tilt mechanism 7.

On the other hand, it is highly probable that the pre-tilt angle α of the liquid crystal molecules in the liquid crystal panel 25 differs, if only slightly, from one liquid crystal projector on a production line to another, and that the optimum angle of rotation β for the optical anisotropic device 45 also differs, if only slightly, in a corresponding manner. However, the angle of rotation β, as set in the production stage, may be optimized in case the optical anisotropic device 45 is mounted on the compensation plate tilt mechanism 7 and the angle of rotation β as set in the production stage is subsequently adjusted little by little according to the present invention.

It should be noted that the liquid crystal projector 1, embodying the present invention, is not limited to the case of employing vertical alignment liquid crystal device, and may also be applied to the electrically controlled birefringence system of the homogeneous alignment.

The liquid crystal projector 1, embodying the present invention, is not limited to the case where the optical anisotropic device 45 is arranged between the light incident light polarizing plate 24 and the liquid crystal panel 25 and may, of course, be arranged between the light radiating side light polarizing plate 26 and the liquid crystal panel 25.

Although the present invention has so far been explained with reference to the preferred embodiments, the present invention is not limited to the particular configurations of these embodiments. It will be appreciated that the present invention may encompass various changes or corrections such as may readily be arrived at by those skilled in the art within the scope and the principle of the invention.

The invention claimed is:

1. A liquid crystal projector including a light source, an illuminating optical system for condensing a light beam, radiated from said light source, on a desired light path, a liquid crystal device for light modulating the light beam, collected by said illuminating optical system, by liquid crystal molecules arranged in a state of vertical alignment, and a projection lens for projecting said light beam, light modulated by said liquid crystal device, to an enlarged scale, said liquid crystal projector comprising:

light polarization controlling means including a first light polarizing plate and a second light polarizing plate, arranged on a light incident side and on a light radiating side of said liquid crystal device, respectively; said first light polarizing plate transmitting a first polarized light component in said light beam collected by said illuminating optical system and routing the transmitted first polarized light component to said liquid crystal device; said second light polarizing plate transmitting a second polarized light component in said light beam radiated from said liquid crystal device and routing the transmitted second polarized light component to said projection lens; and phase difference means formed by an optical anisotropic device arranged between said first light polarizing plate and said liquid crystal device or between said second light polarizing plate and said liquid crystal device;

said optical anisotropic device of said phase difference means being tilted by an angle from a plane parallel to the liquid crystal device and with an optical axis of the optical anisotropic device as the center of rotation, wherein the angle is correlated with the direction of alignment of liquid crystal molecules in said liquid crystal device.

2. The liquid crystal projector according to claim 1 wherein said optical anisotropic device of said phase difference means is tilted by an angle which is correlated with the refractive index of a medium from said liquid crystal device up to said optical anisotropic device and with the refractive index of said liquid crystal device.

3. The liquid crystal projector according to claim 1 wherein liquid crystal molecules in said liquid crystal device are of homeotropic alignment.

4. The liquid crystal projector according to claim 1 wherein said optical anisotropic device of said phase difference means is tilted by an angle about the direction perpendicular to the direction of alignment of liquid crystal molecules in said liquid crystal device.

5. The liquid crystal projector according to claim 1 further comprising: means for adjusting the angle of tilt of said optical anisotropic device of said phase difference means.

6. The liquid crystal projector according to claim 5, wherein the adjusting means includes a compensation plate tilt mechanism for supporting the optical anisotropic device and changing the angle of rotation of the optical anisotropic device from the plane parallel to the liquid crystal device.

7. The liquid crystal projector according to claim 6, wherein the compensation plate tilt mechanism includes a support block defining an opening; a rotary ring rotatably attached to the support block within the opening; an optical compensation plate mounting unit that supports the optical anisotropic device; and a tilt shaft connecting the mounting unit to the rotary ring for rotating the mounting unit perpendicular to the axis of rotation of the rotary ring.

* * * * *